United States Patent [19]

Zhang et al.

[11] Patent Number: 5,516,583
[45] Date of Patent: May 14, 1996

[54] ADHESIVE FOR TAMPER EVIDENT SEALS

[75] Inventors: David D. Zhang, Newark; I-Hwa Lee, Wilmington, both of Del.

[73] Assignee: E. I. Du Pont de Nemours and Company, Wilmington, Del.

[21] Appl. No.: 296,890

[22] Filed: Aug. 29, 1994

[51] Int. Cl.$^6$ ............ C08L 23/08; C08L 33/06; C08L 31/04; C08L 25/06

[52] U.S. Cl. ............ 428/355; 525/222; 525/227; 525/240; 525/241

[58] Field of Search ............ 428/355; 525/240, 525/241, 222, 227

[56] References Cited

U.S. PATENT DOCUMENTS

| | | | |
|---|---|---|---|
| 3,644,252 | 2/1972 | Shenfeld et al. | 260/27 R |
| 4,361,237 | 11/1982 | Heiremans et al. | 206/631 |
| 4,427,744 | 1/1984 | Hume, III | 428/462 |
| 4,670,349 | 6/1987 | Nakagawa et al. | 428/516 |
| 4,772,650 | 9/1988 | Ou-Yang | 524/271 |
| 4,855,335 | 8/1989 | Neperud | 523/111 |
| 4,861,677 | 8/1989 | Lee | 428/516 |
| 4,910,085 | 3/1990 | Raniere et al. | 428/412 |
| 4,931,327 | 6/1990 | Liv et al. | 428/36.5 |
| 5,037,700 | 8/1991 | Davis | 428/414 |
| 5,178,946 | 1/1993 | Sato et al. | 428/412 |
| 5,225,482 | 7/1993 | Nakagawa et al. | 525/71 |
| 5,250,349 | 10/1993 | Nakagawa et al. | 428/212 |
| 5,252,395 | 10/1993 | Marvoka et al. | 428/355 |
| 5,270,358 | 12/1993 | Asmus | 524/55 |
| 5,310,060 | 5/1994 | Bitner et al. | 206/352 |
| 5,319,016 | 6/1994 | Saito et al. | 524/504 |

*Primary Examiner*—W. Robinson H. Clark

[57] ABSTRACT

The inventive adhesive composition provides a whitening effect upon peeling. The composition comprises (A) ethylene vinyl acetate polymer, ethylene acrylate polymer or mixtures thereof; (B) a styrene polymer, and optionally (C) a polyolefin.

1 Claim, No Drawings

5,516,583

ADHESIVE FOR TAMPER EVIDENT SEALS

BACKGROUND OF THE INVENTION

This invention relates to an adhesive resin composition based on an ethylene vinyl acetate polymer or an ethylene acrylate polymer. More specifically, it relates to an adhesive resin composition which is useful in peel and seal applications and demonstrates a whitening effect upon peeling. The whitening effect deters tampering by alerting a consumer that a sealed package has been opened.

Numerous adhesive resin compositions based on ethylene/vinyl acetate copolymers and ethylene acrylate copolymers are known in the art. For example, it is known to have an adhesive resin composition of (A) an ethylene/vinyl acetate copolymer having a vinyl acetate content of 5 to 40% to weight and (B) a tackifier, the ratio of A:B being 50-99:50-1. The tackifier may be rosin, rosin derivatives, aromatic hydrocarbon resins, aliphatic hydrocarbon resins, ester gum, cyclopentadiene resin, terpene resins and beta-pinene resin. The adhesive composition may further comprise a polyolefin resin, including a modified polyolefin having grafted thereto an unsaturated carboxylic acid or its anhydride. Such adhesive resin compositions can be applied to or extrusion-coated on low-density polyethylene, high-density polyethylene, ethylene/vinyl acetate copolymer, polyvinyl chloride, polyvinylidene chloride, polycarbonate, polystyrene, polypropylene, polybutylene, ABS, glass wood, cloth or other substrates.

Such adhesive compositions, however, do not prove to be satisfactory in every respect. For example, the packages or substrates which are adhered with such prior art adhesives are capable of being opened and subsequently resealed without evidence of tampering.

In the past, for example, in the packaging of certain types of food, candy bars, which require packaging sealed with a cold adhesive, a sealed package is capable of being opened and subsequently put back together without evidence of tampering. The present invention remedies this problem.

A number of tamper evident seals exist in the art. For example, U.S. Pat. No. 4,429,015 discloses a multiple laminate for identification cards. Attempts to delaminate the card results in fibers being torn from a uniaxially oriented polyethylene or polypropylene layer of the laminate.

U.S. Pat. No. 4,121,003 discloses switch-proof labels using a laminate having a pattern printed on the label inner surface and a coating of pressure-sensitive adhesive film on the inner surface. Attempts to transfer the label result in disruption of the printed pattern.

U.S. Pat. No. 4,931,327 discloses a tamper-evident film which may be used to provide a tamper-evident packaging seal. In forming a package seal, the tamper-evident film may be bound to either an identical or a different film with an adhesive, heat sealant, or heat seal. The adhesive, heat sealant, or heat seals have a seal internal cohesion and an affinity for bonded surfaces greater than the internal cohesive force of the tamper-evident film so that if a force is applied to separate the films, rupture is initiated by the cavitated skin, and tamper evidence occurs.

Such tamper-evident seals and laminates are expensive and difficult to produce. The prior art seals rely on the structure and configuration of the layers. Therefore, a simple, inexpensive adhesive seal having the desirable characteristics of the prior art and also having a tamper-evident property is much desired.

SUMMARY OF THE INVENTION

The present invention provides a tamper-evident packaging seal utilizing an adhesive which provides a tamper-evident property to a package seal.

This tamper-evident packaging film can be sealed with heat or cold seals, preferably heat. Opening of the seal will result in irreversible whitening of the film so that the package cannot be resealed without evidence of tampering.

The present invention is a tamper-evident adhesive and a tamper-evident multilayer packaging film. The adhesive demonstrates a whitening effect upon peeling. The whitening effect is evidenced by an L value on a Hunter colormeter test, using a black background, of at least 47.

The adhesive composition is:

a) 10 to 99 wt %, preferably 50 to 90 wt %, of ethylene-vinyl acetate polymer, preferably with a vinyl-acetate content of 2–40 wt %, or ethylene acrylate polymers, preferably with acrylate content of 2–30 wt %, or mixtures thereof;

b) 1 to 90 wt %, preferably 10 to 50 wt %, of styrene polymer;

c) optionally, a polyolefin.

The weight percents are based on components (a) plus (b).

As a result of the present invention, a tamper-evident packaging seal is provided utilizing a tamper-evident packaging film with excellent barrier properties, a pleasing appearance, and a unique tamper-evident property which adds substantially to the security of the product packaged within it. In addition, the adhesive resin composition typically has excellent color, weatherability and extrudability and typically gives a film of a uniform thickness by extrusion.

DETAILED DESCRIPTION OF THE INVENTION

Component (a) of the resin composition of this invention is selected from an ethylene/vinyl acetate polymer, or an ethylene acrylate polymer, preferably an ethylene methyacrylate polymer or an ethylene/ethyl acrylate polymer.

The ethylene/vinyl acetate polymer is not limited, but preferably has a vinyl acetate unit content of 2 to 40% by weight, especially 6 to 20% by weight. If the vinyl acetate unit content is less than 2% by weight, the resulting adhesive resin composition tends to have insufficient adhesion to styrene-type resins. When it exceeds 40% by weight, the compatibility with the other components tends to decrease, and the adhesion of the composition to a saponified product of an olefin/vinyl acetate copolymer tends to be insufficient. The ethylene/vinyl acetate polymer may optionally be modified by methods well known in the art, including modification with an unsaturated carboxylic acid or its derivatives, such as maleic anhydride or maleic acid. The ethylene/vinyl acetate copolymer preferably has a melt flow rate, measured in accordance with ASTM D-1238 of 0.1 to 40 g/10 min, especially 0.3 to 10 g/10 min. If the melt flow rate is less than 0.3 g/10 min, the melt viscosity of the resulting adhesive. resin composition is too high. If it exceeds 40 g/10 min, the melt viscosity of the resulting adhesive resin composition is too low. In either case, the adhesive resin composition tends to have reduced extrudability.

The ethylene acrylate polymer of the present invention is not limited, but are preferably ethylene methyl acrylate and the ethylene ethyl acrylate polymers, and preferably have an acrylate content of 2 to 30% by weight, especially 3 to 20%. If the acrylate unit content is less than 2% by weight, the resulting adhesive resin composition tends to have insufficient adhesion to styrene-type resins. When it exceeds 30% by weight, the compatibility with the other components tends to decrease, and the adhesion of the composition to a saponified product of an olefin/acrylate copolymer tends to be insufficient. The ethylene acrylate polymers of the present invention may optionally be modified by methods well known in the art, including modification with an unsaturated carboxylic acid or its derivatives, such as maleic anhydride or maleic acid. The ethylene/acrylate copolymer preferably has a melt flow rate, measured in accordance with ASTM D-1238 of 0.1 to 40 g/10 min, especially 0.3 to 10 g/10 min. If the melt flow rate is less than 0.3 g/10 min, the melt viscosity of the resulting adhesive resin composition is too high. If it exceeds 40 g/10 min, the melt viscosity of the resulting adhesive resin composition is too low. In either case, the adhesive resin composition tends to have reduced extrudability.

Component (b) is a styrenic polymer which could be styrene homopolymer, impact modified polystyrene, or styrene copolymer. Component (b) may also comprise polymers of styrene derivatives, such as 4-n-butylstyrene, 4-t-butylstyrene, 2,4-diisopropylstyrene, 2,5-dimethylstyrene, hydroxystyrene, 3,4-diethylstyrene, 2-hydroxymethylstyrene, 4-methylstyrene, 2-methylstyrene and the like. Component (b) is not, however, a styrenic block polymer such as polystyrene-polybutadiene-polystyrene (S-B-S), polystyrene-polyisoprene-polystyrene (S-I-S), polystyrene-poly(ethylene/butylene)-polystyrene (S-EB-S), and polystyrene-poly(ethylene/propylene)-polystyrene (S-EP-S) polymers). Polymer component (b) may comprise one or more styrene polymers.

The optional polymer component (c) is a polyolefin which preferably comprises the following characteristics:

1) a melt flow rate of about 0.1–50 g/10 min, preferably about 0.3 to 30 g/10 min and more preferably about 1 to 10 g/10 min. Melt flow rates are measured differently for polyethylene and polypropylene polymers. For polypropylene type of polymer, melt flow index is measured under 230° C. and 2.16 kg. For polyethylene type of polymer, the melt flow index is measured under 190° C. and 2.16 kg;
2) a density of about 0.820–0.970 g/cc, preferably about 0.850–0.965, and more preferably about 0.9 to 0.960 g/cc;
3) a melting point (ASTM D3418) in the range of about 60° C. to 170° C., preferably from 100° C. to 165° C., more preferably 130° C.–165° C.

The polyolefin component (c) is not limiting and can, for example, be a homopolymer or copolymer of propylene, ethylene, butene, hexene or octene, preferably a homopolymer. The polyolefin component (c) may also be a modified polyolefin such as metallocene polyethylene. Exemplary polyolefins are ethylene alpha-olefin random copolymers, ethylene vinyl acetate copolymer (other than component (a) ethylene/vinyl acetate polymers), ethylene alkyl acrylate copolymers, propylene polymers, and ethylene propylene elastomers containing a small amount of unsaturated compounds having a double bond. Preferably, polyolefin component (c) comprises a major portion (by weight) of ethylene which is preferably copolymerized with another alpha-olefin. The alpha olefin preferably contains 3 to about 20 carbon atoms and can represent up to about 20% by weight of the copolymer. Preferred alpha-olefins are propylene, 1-butene, 1-hexene, 4-methyl-1-pentene, 1-octene, 1-decene, 1-tetradecene, 1-octadecene, etc. and these alpha olefins may be used either singularly or in admixtures of two or more. Particularly preferred are propylene, 1-butene, 1-hexene, 1-octene and 4-methyl-1-pentene. Blends of two or more of these ethylene alpha olefin copolymers can also be used in accordance with the present invention. Ethylene copolymers having small amounts of a diolefin component such as butadiene, norbornadiene, hexadiene and isoprene are also generally suitable, although less preferred. Thus, a wide variety of olefinic polymers and copolymers can be used in accordance with the present invention.

Optionally, all or part of polyolefin component (c) can be grafted with a mono- or multi- carboxylic acid moiety (or an anhydride derivative of a carboxylic acid moiety), by polymerizing a grafting monomer having vinyl or allylic functionality and the acid or anhydride moiety. Other grafting monomers, such as styrene and/or vinyl acetate can also be used in place of or in addition to the carboxylic grafting monomers.

The olefinic component is preferably produced by any process well known in the art including those utilizing a Ziegler-type catalyst or a metallocene type catalyst. Such processes for polyethylene polymer and copolymer are well known and need not be described further.

The adhesive resin composition of this invention may be produced by mixing predetermined amounts of the polymer component (a), the styrene polymer (b) and optionally the polyolefin (c) by a mixer such as a Henschel mixer, a V blender, a ribbon blender or a tumbler blender; or after mixing, melt-kneading the mixture by a single screw extruder, a twin screw extruder, a kneader, a Banbury mixer, etc. and then pelletizing, melt extruding, granulating or pulverizing the mixture.

The adhesive resin composition of this invention may further include slip additives, antiblock agents, chill roll release agents, antifog additives, antistatic additives, heat stabilizers, weatherability stabilizers, antistatic agents, pigments, dyes, rustproofing agents, etc., preferably in amounts which do not impair the objects of this invention.

The total amount of such other optional additives is preferably less than about 25% by weight of the final composition, more preferably less than 15% and yet more preferably less than 10%. Additives can be added directly or through the use of a masterbatch concentrate.

The melt flow rate of the final composition is preferably about 0.1 to 40 g/10 min, more preferably 0.3 to 30 g/10 min, and yet more preferably 0.5 to 20 g/10 min, measured by ASTM D 1238. As noted above, the adhesive composition demonstrates a whitening effect upon peeling. In practice, the whitening effect may vary depending on the substrate, the precise loading of the adhesive, the temperature and other conditions. In addition, following peeling of a laminated structure, one face of the adhesive composition may exhibit a greater whitening effect than the other face. The whitening effect is evidenced by an L value on a Hunter colormeter test, using a black background. An L value of 0 is for an absolutely black sample and an L value of 100 is for an absolutely white sample. The adhesive composition preferably exhibits an L value of at least 47.

The adhesive resin composition of this invention can be used to bond various substrates or polymers to each other. Typically, the articles are bonded or adhered by heat seal.

As such, the present invention further is directed to monolayer, coextruded or lamination structure which involves the inventive adhesive as a layer, typically a heat seal layer, to provide whitening effect upon peel. The peel seal strength of the present invention to various substrates, including substrates made from ethylene vinyl acetate, polyethylene, polystyrene, polypropylene, polyethylene terephthalate, polyvinyl chloride, metals such as aluminum, TYVEK® (commercially available from E. I. du Pont de Nemours and Company), oriented polyesters such as MYLAR® (commercially available from E. I. du Pont de Nemours and Company), and the like, can be adjusted by varying the amount of vinyl acetate and/or acrylate and/or polyolefin content in the adhesive composition.

Upon proper melt blending or heat mixing, the composition can be extruded through a die via coextrusion. The thickness of the extruded sealant is preferably about 1 to 400 microns, more preferably 5 to 100 microns, yet more preferably 10 to 30 microns.

Alternatively, the compositions of the present invention can be extruded into a film having a thickness of about 1 to 100 microns, more preferably 5 to 100 microns and yet more preferably 10 to 75 microns and subsequently laminated to paper, foil, or film as part of a multilayer structure.

In use, the multilayer structure is pressed against a substrate surface material and heated, thereby bonding the multilayer structure to the substrate; preferred substrate surface material, including substrates made from ethylene vinyl acetate, polyethylene, polystyrene, polypropylene, polyethylene terephthalate, polyvinyl chloride, metals such as aluminum, TYVEK® (commercially available from E. I. du Pont de Nemours and Company), oriented polyesters such as MYLAR® (commercially available from E. I. du Pont de Nemours and Company), and the like.

For example, the adhesive resin composition of this invention may be used to produce a laminated structure, such as a structure of a styrene type resin (PS) and a saponified olefin/vinyl acetate copolymer (EVOH). This laminated structure may be produced, for example, by melting the adhesive resin composition of this invention, PS and EVOH in separate extruders, feeding the melts to a die of a three-layer structure, and coextruding them with the adhesive resin composition of this invention as an interlayer; or by first forming a layer of PS and a layer of EVOH, and melt-extruding the adhesive resin composition of this invention between the two layers (the sandwich laminating method). The coextruding :method is preferred because it can achieve a good delamination strength. The coextruding method may be divided into a T-die method using a flat die and an inflation method using a circular die. The flat die may be a single manifold die using a black-box or a multimanifold die. The inflation method may be carried out by using any known dies.

Examples of the styrene-type resin used for producing such a laminated structure using the adhesive resin composition of this invention are polystyrene, high-impact polystyrene (rubber-blended polystyrene), AS resin (SAN) and ABS resin.

Because the adhesive resin composition of this invention has excellent adhesion to various vessels and substrates and has desirable color, weatherability, extrudability and film uniformity, it can be conveniently used to laminate substrates, including substrates made from ethylene vinyl acetate, polyethylene, polystyrene, polypropylene, polyethylene terephthalate, polyvinyl chloride, metals such as aluminum, TYVEK® (commercially available from E. I. du Pont de Nemours and Company), oriented polyesters such as MYLAR® (commercially available from E. I. du Pont de Nemours and Company) and the like, to provide packaging films, pressure-formed cups and hollow bottles which have excellent gas barrier property, moisture proofness and transparency and are useful for packaging or holding foods and medicines.

In addition to providing the advantageous tamper-evident whitening effect, the adhesive is almost odorless, relatively heat stable, radiation stable and has excellent extrusion characteristics. The adhesive is particularly useful for peel and seal applications.

As noted above, films and coatings can be made from the compositions of the present invention and laminated or coated onto other films or structures. Alternatively, the composition of the present invention can be simultaneously coextruded with other materials. To summarize, the adhesive resin compositions of the present invention have outstanding utility due to their unique chemical and physical properties as bonding agents and adhesives which exhibit whitening upon peeling. The adhesive resin compositions are especially good as so-called peel and seal adhesives and can be used in forms such as adhesive sheets, tapes, or laminated products. They can be added to other conventional adhesive compositions and can also be added to conventional polyolefins to allow the polyolefin to perform as an adhesive.

The final adhesive composition can be used directly, for example in a melt coextrusion, or it can be extruded in rope or pellet form or reduced to a chip or powder form for use in an appropriate applicator. It can be cast or extruded into a film or web form for subsequent use. In such shaped forms, it can be placed between the substances to be bonded and then activated by heat and pressure. It should be noted that the adhesives of this invention can be applied by any of the hot melt applicators commonly used by the practitioner.

Although these compositions can be applied in any thickness the practitioner finds expedient, it is preferred to employ layer thickness of from 0.0002 mils to 10 mils.

The present invention further provides a seal or laminate suitable for application to plastic containers by heat sealing, which has a good heat sealing property and can be easily peeled.

The present invention is also useful, for example, in tamper-evident packages, such as blister packages for medicaments and nonmedicaments which is user-friendly to patients and other users of the package. It is an attractive and inexpensive package for the merchandising of pharmaceutical and other products which is constructed in a manner which facilitates mass production.

The packages of the invention may contain from one to a multiplicity of articles, such as food, medicaments in the form of capsules, tablets, medical instruments, syringes, lozenges, pills and/or the like, or nonmedicaments, such as poisons, catalysts, cleaning compositions, batteries, nuts, bolts, hooks and/or other small hardware.

EXAMPLES

The following examples illustrate the present invention more specifically. It should be understood that the invention is in no way limited by these examples unless it departs from its scope described and claimed herein.

Blend Preparation

The adhesive resin blends were prepared by dry blending the ingredients together in a polyethylene bag and subsequently melt compounded in a 30 mm twin screw extruder. The melt temperature was approximately 220° C.

The components used in the examples are described in detail in Table 1. Various adhesive blends, their heat seal strengths and the whitening effects are reported in Table 2.

Film Preparation

The laminates are a three-layer blown film construction of polyethylene (1.0 mil)/polyethylene (1.0 mil)/adhesvie resin described in Table 2 (1.0 mil). The polyethylene is a low density polyethylene with melt index of 0.35 and density of 0.92 g/cc. The resins were extruded in three one-inch extruders feeding into a Brampton blown film die. The melt temperature in the extruders was approximately 230° C.

Heat Seal Test

The heat seal test was run under DuPont CR188 method. In particular, the film samples were conditioned under room temperature, 50% relative humidity (RH) for overnight before being cut into one-inch strips and heat sealed onto an ethylene vinyl acetate film (4% vinyl acetate) under 40 psi, 1 second dwell and 135° C. (275° F.) seal temperature. The sealed film samples were then conditioned again under room temperature and 50% RH for overnight. Peel seal strengths were recorded by an Instron at cross head speed about 12 inch/min. Results are reported in Table 2.

Whitening Effect Test

The whitening effect of peeled film was determined by (a) a whitening index measurement, and (b) a nonstandard Hunter color meter test method. This whitening index test is a comparative test using visual observation, in which the whitening effect of the samples is ranked on a scale of 1–5. One represents least whitened, 5 represents extremely whitened and 3 is in between. To start the test, we pick the most whitened sample and place it side by side with any sample we want to test. The samples are then ranked. It should be recognized that the ranking number 5 may not represent the whitest sample known by man and ranking number 1 may not be white at all. In the standard Hunter color test, a white background disk is used. Because some of the inventive films are transparent or semitransparent, using a white background will interfere with the color results. Instead of a white background, a black background was employed. As such, the test measures the relative difference in color for the film samples. Such relative difference is exemplary of the whitening effect, which is evidence of tampering. During the test, a peeled film sample was placed next to a black disk, the film color was recorded by the Hunter colormeter. For the control (black disk), the L value is registered at 24. The Hunter Colormeter test results on all the peeled samples are reported in Table 2. The comparative examples are designated as "Comp" in Table 2. The L value for one of our best examples is about 72 vs. control of 24.

TABLE 1

| | Supplier | Type | Density | Melt Index (g/10 min) |
|---|---|---|---|---|
| Component (a) - ethylene/vinyl acetate ("EVA") polymer or ethylene acrylate polymer ("EMA") | | | | |
| PE3507-2 | E.I. du Pont de Nemours and Company | EVA | 0.93 | 2.6*** |
| Elvax ® 3120 | E.I. du Pont de Nemours and Company | EVA | 0.93 | 1.2*** |
| Elvax ® 3130 | E.I. du Pont de Nemours and Company | EVA | 0.94 | 2.5*** |
| Elvax ® 3130SB | E.I. du Pont de Nemours and Company | EVA | 0.94 | 2.5*** |
| Elvax ® 3170 | E.I. du Pont de Nemours and Company | EVA | 0.94 | 2.5*** |
| Elvax ® 3175 | E.I. du Pont de Nemours and Company | EVA | 0.95 | 6.0*** |
| Fusabond ® D182 | E.I. du Pont de Nemours and Company | EVA | 0.95 | 1.6*** |
| Optema ® TC020 | Exxon Chemical Company | EMA | 0.93 | 2.0*** |
| Component (b) - Styrene Polymer | | | | |
| HCC 850 | Huntsman Chemical Company | Hign Impact Polystyrene | 1.04 | 2.5* |
| Styron ® 663 | The Dow Chemical Company | Polystyrene | 1.04 | 1.5* |
| Styron ® 484 | The Dow Chemical Company | High Impact Polystyrene | 1.05 | 3.0* |
| Component (c) Polyolefin | | | | |
| PP5384 | Huntsman Chemical Company | Polypropylene | 0.9 | 2.0** |

*ASTM 1238 G (200° C., 5 kg)
**ASTM 1238 L (230° C., 2.16 kg)
***ASTM 1238E (190dc, 2.16 kg)

TABLE 2

| Example | Component (a) - ethylene/vinyl acetate polymer or ethylene acrylate polymer | Wt % (a) | Component (b) - Styrene Polymer | Wt % (b) | Component (c) - Polyolefin | Wt % (b) | Heat Seal Strength (g/in) | Whitening Index | Hunter Color Meter - L Value |
|---|---|---|---|---|---|---|---|---|---|
| EX 1 | ELVAX ® 3120 | 85 | HCC850 | 10 | PP5384 | 5 | 1600 | 5 | 60 |
| EX 2 | ELVAX ® 3120 | 80 | HCC850 | 10 | PP5384 | 10 | 750 | 5 | 50 |
| EX 3 | ELVAX ® 3120 | 75 | HCC850 | 10 | PP5834 | 15 | 550 | 5 | 51 |
| EX 4 | ELVAX ® 3120 | 70 | HCC850 | 10 | PP5384 | 20 | 450 | 4 | 52 |
| EX 5 | ELVAX ® 3120 | 90 | HCC850 | 10 | | | 2000 | 5 | 72 |
| EX 6 | ELVAX ® 3120 | 90 | STYRON ® 484 | 10 | | | 1900 | 5 | 67 |
| EX 7 | ELVAX ® 3130SB | 90 | STYRON ® 484 | 10 | | | 2500 | 5 | 65 |
| EX 8 | ELVAX 3130SB | 90 | | | PB8240 | 10 | 2400 | 3 | 48 |
| COMP 1 | | | HCC850 | 90 | PP5384 | 10 | 32 | 1 | 36 |
| COMP 2 | ELVAX ® 3120 | 40 | HCC850 | 60 | | | 112 | 2 | 40 |
| COMP 3 | | | | | PP5384 | 100 | 29 | 1 | 36 |

TABLE 2-continued

| Example | Component (a) - ethylene/vinyl acetate polymer or ethylene acrylate polymer | Wt % (a) | Component (b) - Styrene Polymer | Wt % (b) | Component (c) - Polyolefin | Wt % (b) | Heat Seal Strength (g/in) | Whitening Index | Hunter Color Meter - L Value |
|---|---|---|---|---|---|---|---|---|---|
| EX 9 | PE3507-2 | 77.5 | HCC850 | 2.5 | PP5384 | 20 | 550 | 4 | 47 |
| EX 10 | PE3507-2 | 70 | HCC850 | 10 | PP5384 | 20 | 750 | 5 | 61 |
| EX 11 | PE3507-2 | 60 | HCC850 | 20 | PP5384 | 20 | 605 | 5 | 55 |
| EX 12 | OPTEMA ® TC020 | 78.7 | HCC850 | 10 | PP5384 | 11.3 | 1050 | 5 | 55 |
| EX 13 | PE3507-2 OPTEMA ® TC020 | 40 38.7 | HCC850 | 10 | PP5384 | 11.3 | 1150 | 5 | 59 |
| COMP 4 | PE3507-2 | 90 |  |  | PP5384 | 10 | 530 | 2 | 44 |
| COMP 5 | PE3507-2 | 100 |  |  |  |  | 2624 | 1 | 36 |
| COMP 6 | OPTEMA ® TC020 | 100 |  |  |  |  | 2561 | 1 | 37 |
| EX 14 | ELVAX ® 3170 | 86.3 | STYRON ® 663 | 2.5 | PP5384 | 11.3 | 1840 | 3 | 60 |
| EX 15 | ELVAX ® 3170 | 70 | STYRON ® 663 | 10 | PP5384 | 20 | 1600 | 5 | 56 |
| EX 16 | ELVAX ® 3170 | 60 | STYRON ® 663 | 10 | PP5384 | 30 | 553 | 3 | 49 |
| EX 17 | ELVAX ® 3170 | 50 | STYRON ® 663 | 10 | PP5384 | 40 | 467 | 3 | 51 |
| EX 18 | ELVAX ® 3175 FUSABOND ® D182 | 50 10 | HCC850 | 40 |  |  | 1500 | 5 | 66 |
| COMP 7 | ELVAX ® 3170 | 70 |  |  | PP5384 | 30 | 941 | 2 | 45 |
| COMP 8 | ELVAX ® 3170 | 100 |  |  |  |  | 2228 | 1 | 35 |

What is claimed is:

1. An adhesive resin composition consisting essentially of:
   (A) 50 to 90 wt % ethylene-vinyl acetate polymer having a vinyl acetate content of greater than 7 wt % and less than 20 wt % of the total ethylene-vinyl acetate polymer, an ethylene-acrylate polymer or mixtures thereof;
   (B) 10 to 50 wt % of a styrene homopolymer, or a styrene copolymer derived from: 4-n-butylstyrene; 4-t-butylstyrene; 2,4-diisopropylstyrene; 2,5 -dimethylstyrene, hydroxystyrene; 3,4-diethylstyrene, 2 -hydroxymethylstyrene; 4-methylstyrene; or 2-methylstyrene, with the weight percent being based on components (A) and (B) and
   (C) optionally, one or more modifying polymers produced by means of a Ziegler-type catalyst or a metallocene type catalyst and having a melt flow rate of 0.1 to 50 g/10 min., a density of about 0.820 to 0.970 g/cc and a melting point of about 60° to 170° C., said modifying polymers being a member of the group consisting of: an ethylene homopolymer, an ethylene copolymer; propylene homopolymer and a propylene copolymer.

\* \* \* \* \*